(No Model.) 6 Sheets—Sheet 1.
F. B. BEHR.
MOTOR VEHICLE FOR SINGLE RAIL ELEVATED RAILWAYS.
No. 593,076. Patented Nov. 2, 1897.
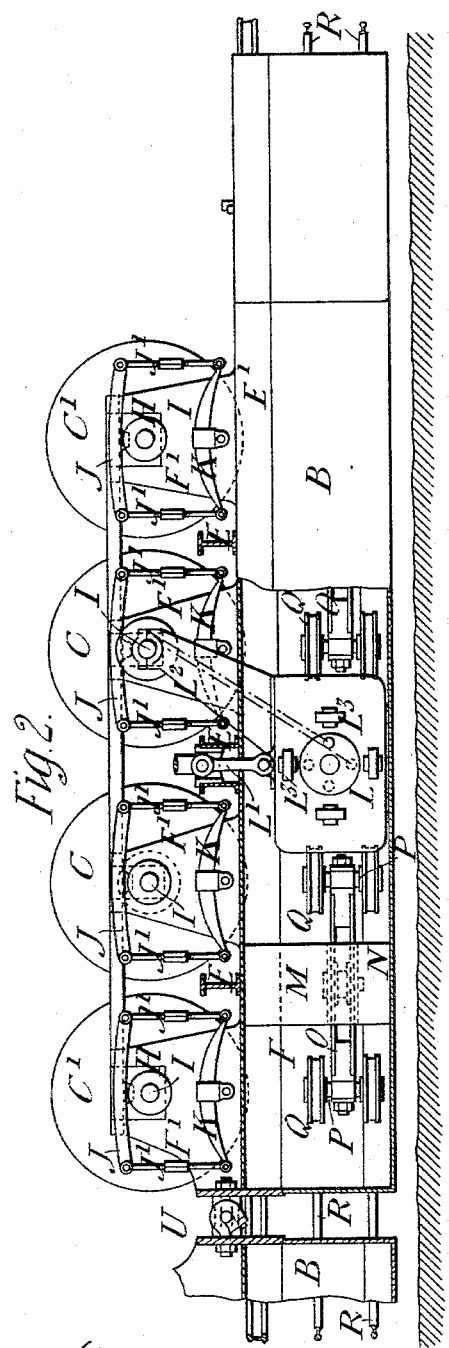
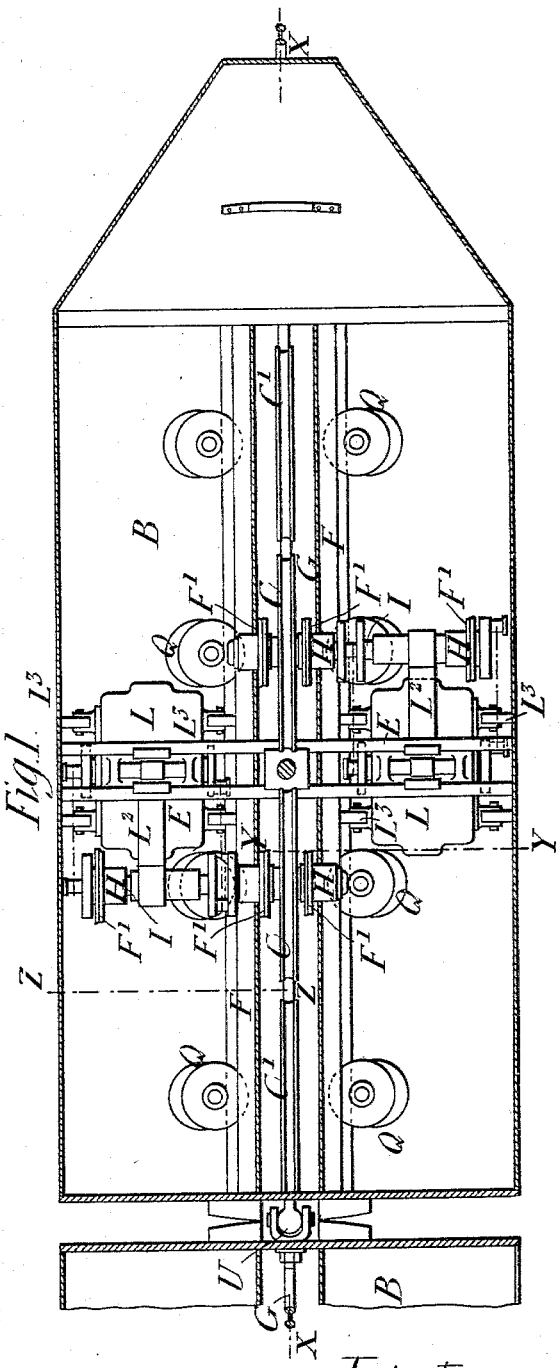
Witnesses
Inventor

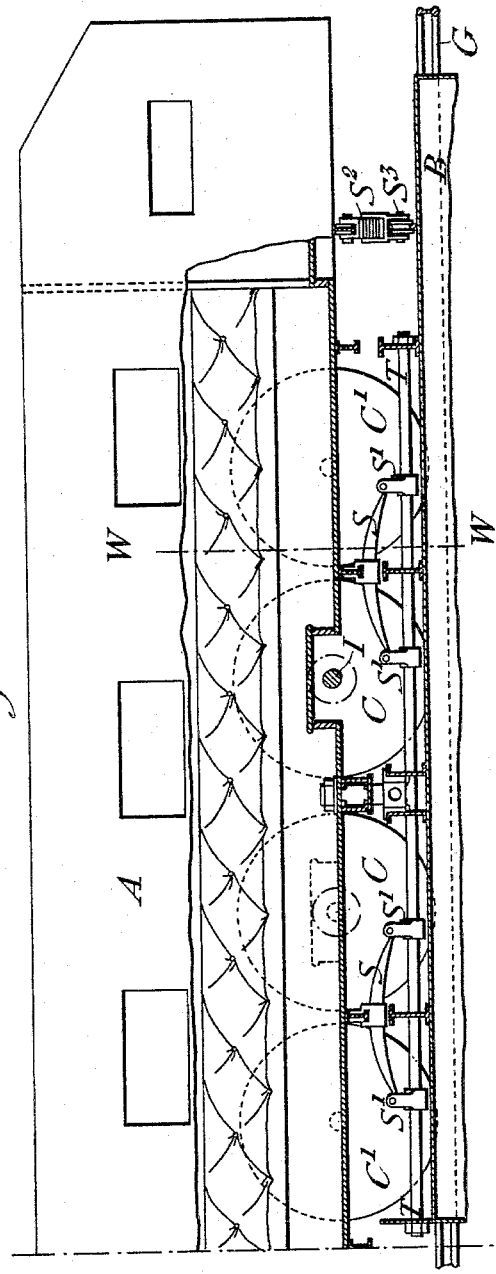

(No Model.) 6 Sheets—Sheet 3.

F. B. BEHR.
MOTOR VEHICLE FOR SINGLE RAIL ELEVATED RAILWAYS.

No. 593,076. Patented Nov. 2, 1897.

Witnesses
Inventor
Fritz B. Behr
By James L. Norris
Atty

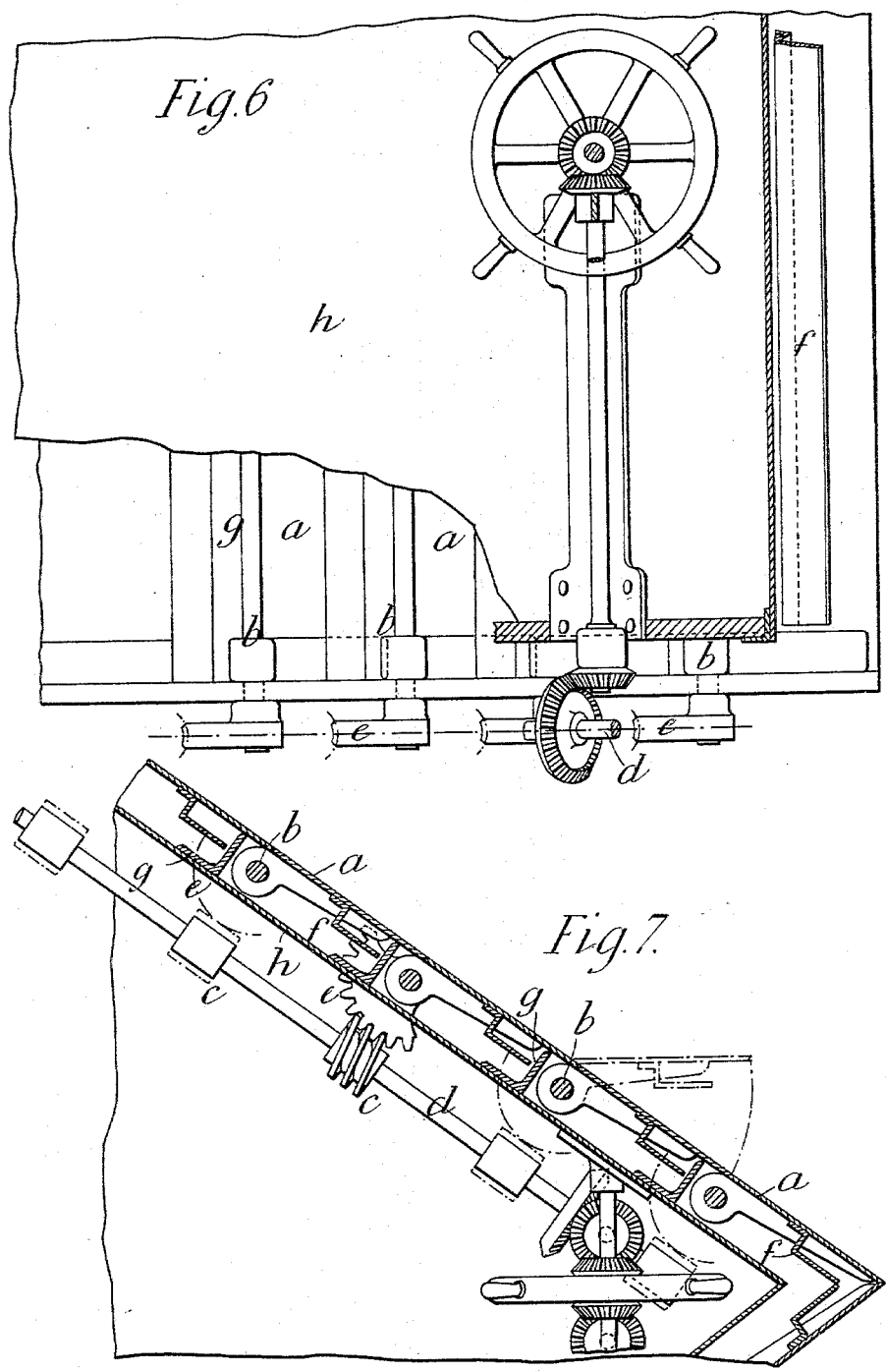

(No Model.) 6 Sheets—Sheet 5.

F. B. BEHR.
MOTOR VEHICLE FOR SINGLE RAIL ELEVATED RAILWAYS.

No. 593,076. Patented Nov. 2, 1897.

(No Model.) 6 Sheets—Sheet 6.

F. B. BEHR.
MOTOR VEHICLE FOR SINGLE RAIL ELEVATED RAILWAYS.

No. 593,076. Patented Nov. 2, 1897.

Witnesses
F. B. Keifer
Philip N. Tilden

Inventor
Fritz B. Behr
By James L. Norris
Atty

UNITED STATES PATENT OFFICE.

FRITZ B. BEHR, OF LONDON, ENGLAND.

MOTOR-VEHICLE FOR SINGLE-RAIL ELEVATED RAILWAYS.

SPECIFICATION forming part of Letters Patent No. 593,076, dated November 2, 1897.

Application filed May 28, 1897. Serial No. 638,576. (No model.) Patented in England December 3, 1896, No. 27,549.

*To all whom it may concern:*

Be it known that I, FRITZ BERNHARD BEHR, a citizen of England, residing at 6 Old Jewry, in the city of London, England, have invented new and useful Improvements in Motor-Vehicles for Single-Rail Elevated Railways, (for which I have obtained Letters Patent in Great Britain, No. 27,549, dated December 3, 1896,) of which the following is a specification.

In the specification to my United States Patent No. 552,812, dated January 7, 1896, I described a construction of motor-vehicles for single-rail elevated railways in which the framing consisted of two separate parts, one of which was carried by the driving and running wheels and was stayed laterally by guide-rollers, while the other part or body was carried by springs on the first part and had downward extensions on each side in which were situated the motor-engines.

My present invention has for its object to simplify and improve the construction of the motor-vehicles described in my said specification. For this purpose, instead of forming the downward extensions of the body of the vehicle that contain the motor-engines in one with the upper part of the body, I make them separate therefrom and connect them rigidly with the part of the frame that is carried by the driving-wheels. I will describe the said improved construction with reference to the accompanying drawings, in which—

Figure 4:
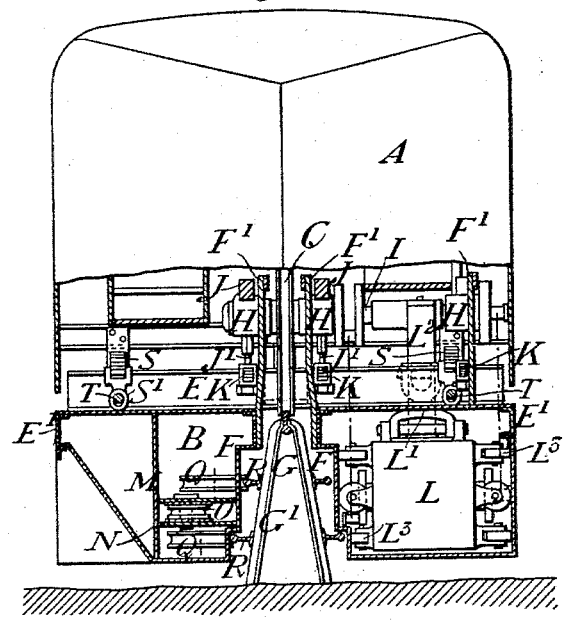
Figure 5:
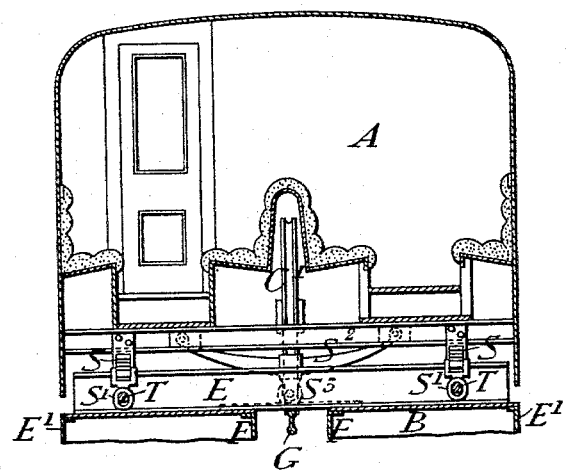
Figure 11:
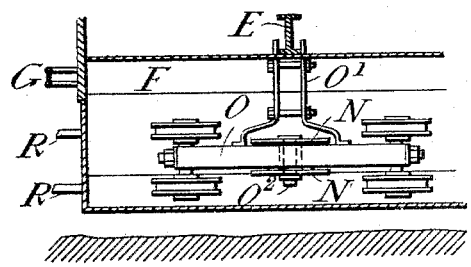
Figure 12:
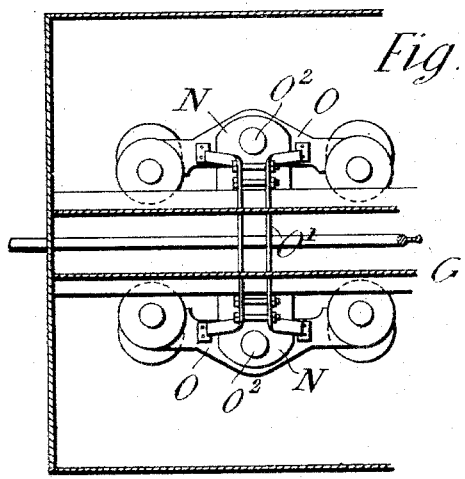
Figure 13:
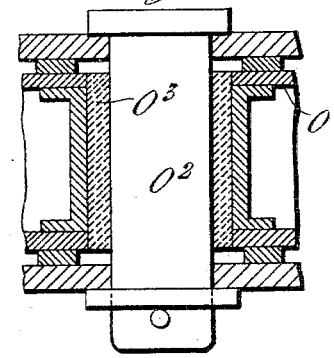

Figure 1 shows a plan of the lower body. Fig. 2 shows a side elevation with the covering-plates removed. Fig. 3 shows a longitudinal section on line X X of the lower body. Fig. 4 shows on the right-hand side a part cross-section on line Y Y, Fig. 1, and on the left hand a part cross-section on line Z Z, Fig. 1. Fig. 5 shows a part cross-section on line W W, Fig. 3. Figs. 6 to 9 show enlarged details of the apparatus for retarding the speed of the carriage. Fig. 10 is a front view, Fig. 11 a side view, Fig. 12 a plan, and Fig. 13 an enlarged section showing details of guide mechanism for the carriage.

The carriage is divided into two separate parts—namely, an upper body A, which contains the passengers, and a lower body B, which is carried by the four driving and running wheels C C C' C', and which contains the two motors L L, imparting motion to the driving-wheels. The framing of the lower body consists of strong transverse girders E, connected together by longitudinal girders E' on the outside and near the middle by the longitudinal side cheeks F, extending down on each side of the standards G', carrying the rail G of the permanent way. These inner side cheeks have horn-plates F' extending upward therefrom, and similar horn-plates extend upward from the longitudinal girders E', and in these horn-plates are situated the axle-boxes H H of the axles I of the wheels C C C' C'. The axles of the driving-wheels C C extend only partly across the carriage, the one on the one side and the other on the other side, in a similar manner to that dscribed in my before-mentioned former patent, and they carry the lower body B by means of whipples J on top of the axle-boxes, which are connected by adjustable rods J' to the ends of springs K, the middles of which are connected by bolts to the framing of the lower body, so that the latter is hung with spring action from the wheel-axles, the spring and suspension-rods being so adjusted that the weight is almost entirely taken by the two middle axle-boxes. In the case of the running wheels C' the axles do not extend beyond the two middle axle-boxes.

Centrally in the lower body B are arranged the two electromotors L L, the armature-shaft of which is connected by cranks and connecting-rods to cranks on the axles I, as shown. They may, however, drive the latter by means of any other suitable gearing. The motor-casings are suspended by strong links L' from the transverse girders, and they are also connected by a rigid arm $L^2$ with their respective axles, so that when in traveling the lower body has a slight vertical motion relatively to the wheel-axles. The motors will always be maintained by the arms $L^2$ at a uniform distance from the axles in swinging to a slight extent on their pivotal connection with the transverse girders.

The motors are stayed laterally by means of guide-wheels $L^3$ against the sides of the body.

Between the inner cheeks and strongly-stayed vertical plates M of the lower body are fixed brackets N, in which are pivoted sway-beams O, to each end of which are pivoted double-ended arms P, carrying two guide-rollers Q, the arms and rollers being arranged, as described in the specification to my said patent, so as to be self-adjusting in bearing against the two lateral guide-rails R of the permanent way. By mounting two pairs of these rollers on each end of a sway-beam O, according to my present invention, I obtain the advantage that each pair is also self-adjusting in a horizontal direction as well as in a vertical one, so that they will allow of running around moderate curves. The beams O might also be acted upon by strong springs pressing the rollers against the guide-rails, so as to afford a slight spring-yielding power when passing around curves. By preference, however, I insure the correct action of the guide-rollers by the arrangement shown in front view, side view, plan, and enlarged section, respectively, at Figs. 10, 11, 12, and 13 of the drawings. I connect together the sway-beams O on each side of the trestle-supports G' by means of a saddle or bridge shaped connecting-piece of steel O', formed so as to pass over the line-rail G and rigidly fixed to the beams O. These are mounted with a certain amount of elastic yielding action upon the swivel-pins $O^2$, carried by the brackets N, by providing between the pin and the tubular boss of the beam a sleeve $O^3$, of caoutchouc, as shown clearly at the section, Fig. 13. By thus tying the two opposite beams O O rigidly together at the exact required distance apart relatively to the guide-rails R it will be seen that when in running on a curve the beam and its guide-rollers on the outer or convex side of the curve tends to shift slightly outward relatively to the center line of the vehicle as allowed by the caoutchouc sleeve. The saddle connection O' will cause the beam O on the inner side to shift inward to the same extent, and thus the guide-rollers on both sides will still maintain their correct positions relatively to the guide-rails.

The upper body A is carried by springs S upon the lower body B, the ends of these springs being mounted with slotted links S' upon strong longitudinal rods T, fixed to the framing of B. At the ends the upper body is also supported on the lower body by means of springs $S^2$, that are carried by a roller $S^3$, bearing on a transverse rail on the lower frame. In the arrangement shown there are two such lower bodies B, carrying a single continuous upper body A, to which each lower body is connected at the middle by a swivel-pin U, so that the two lower bodies with their wheels constitute a bogie to the upper body, being capable of a slight lateral adjustment relatively thereto on the swivel-pin, owing to the manner in which the springs S are connected to the lower body. The upper body might, however, also be divided into two parts corresponding to the lower body and connected together by a flexible middle part, as described in the before-mentioned patent.

With motor-vehicles constructed as above described, which are intended to run at very high speeds, such as one hundred miles an hour, there would be considerable difficulty in stopping them by means of ordinary frictional brake-gear, as owing to the high surface speed of the wheels any application of brake-blocks would cause heating to so high a temperature as to destroy the parts. According to my present invention I obviate this disadvantage by first producing very considerable atmospheric resistance to the motion of the vehicle, so as to rapidly reduce the speed to that at which ordinary brake-gear can be applied with safety. For this purpose the front part of the vehicle, which is of pointed shape, as in the former patent, has its outer surfaces constructed of a number of vertical blades or wings capable of being projected outward (more or less) at right angles to the direction of motion. When the motor-vehicle is traveling, these blades are closed down, so as to form collectively a smooth sloping surface. When it is desired to stop or slacken speed, the conductor, by suitable gear worked either by power or by hand, gradually moves the blades or wings outward either consecutively or simultaneously, so that each one presents its surface more or less at right angles to the direction of motion, and thus the air in impinging upon such surfaces will offer such a collective resistance to the motion as will rapidly reduce the speed. Various arrangements of mechanism may be employed for effecting the said operation.

Figs. 6 and 7 are a part elevation and plan showing one arrangement in which the blades $a$, mounted on pivots $b$ at top and bottom, are all turned simultaneously and very gradually into the open position by means of worms $c$ on a shaft $d$, turned either by hand or by a small motor, which worms gear with toothed segments $e$, fixed on the lower ends of the spindle $b$, carrying the louvre-blades $a$. Thus on turning the shaft $d$ the spindle $b$ and blades $a$ will be gradually turned from the closed position shown in full into the position shown in dotted lines.

The blades $a$ are strengthened to withstand the air-pressure to which they are subjected by Z-iron ribs $f$, which also have the effect of preventing the full air-pressure being exerted all over the inclosed space behind each blade the moment the blades are slightly opened, and thus to prevent too sudden a shock, as the inner part of the Z-iron keeps that space closed until the blade has been opened so far that the Z-iron is clear of the angle-iron ribs $g$, fixed to the inner inclosure $h$ of the side of the car, and consequently until the speed has been slackened to some extent.

Figure 8:
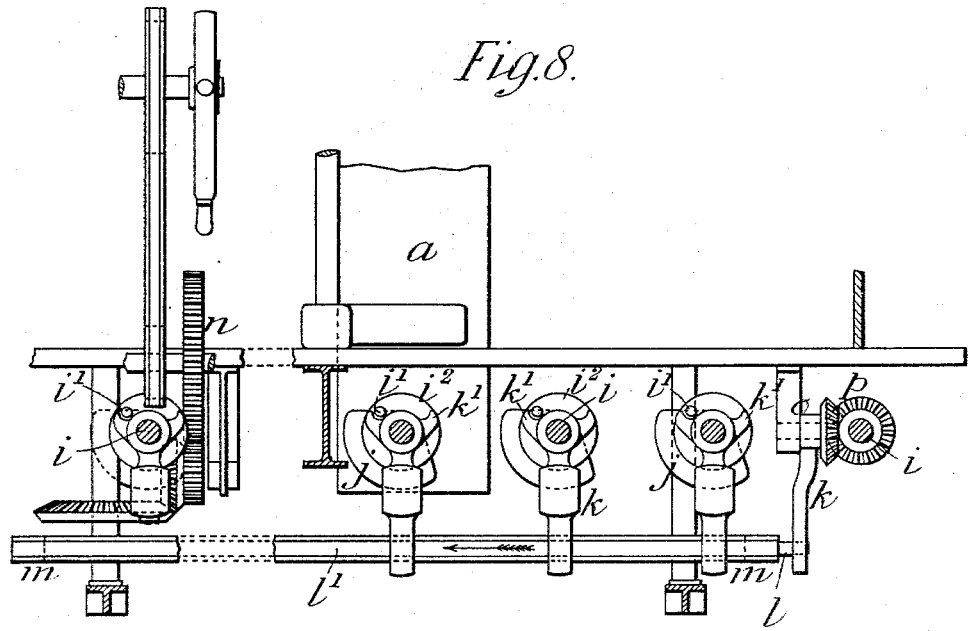
Figure 9:
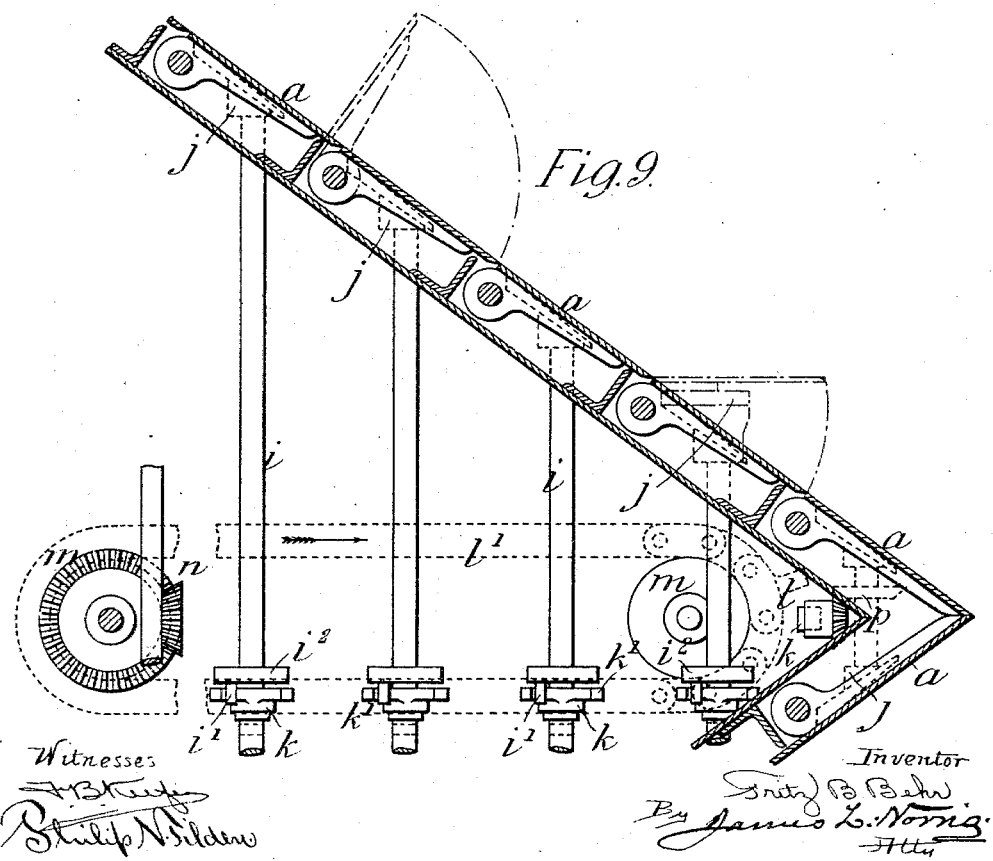
Figure 10:
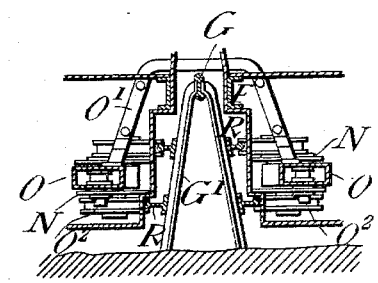

Figs. 8 and 9 show a part elevation and sectional plan of another arrangement in which each pair of blades is successfully opened to their full width until the desired slackening of speed has been obtained, so that the increase of resistance will be correspondingly gradual. For this purpose a transverse shaft $i$ is provided for each pair of opposite blades $a$, which shafts have cams $j$ at their ends that bear with inclines against the inner face of the lower ends of the blades, so that by the partial rotation of the shaft and cams these push the blades open to a certain extent, as indicated by the dotted position, after which the pressure of the air will throw them full open.

Each shaft $i$ carries a loose tumbler-lever $k$ with fingers $k'$, that can bear against a stud $i'$ on a disk $i^2$, fixed on the shaft. The levers $k$ ordinarily hang down, as shown at Fig. 8, in which position they lie in the path of a finger $l$, fixed on an endless chain $l'$, stretched round two chain-wheels $m$, one of which can be rotated by suitable gearing $n$. The front shaft $i$ has its tumbler-lever $k$ mounted on a separate pivot $o$ and is geared to $i$ by bevel-gear $p$.

It will be seen that the finger $l$ being in the position shown it will on the rotation of the chain-wheels first move the front lever $k$ so as to open the front blade, and being then carried round to the second lever $k$ it will effect the opening of the second pair, and so on in succession.

Having thus described the nature of this invention and the best means I know for carrying the same into practical effect, I claim—

1. The combination in motor-vehicles for single-rail elevated railways, of two separate bodies A and B, of which the lower body B is suspended from the axles of the driving and running wheels by springs K and rods T and is supported against lateral motion by means of guide-wheels Q, mounted on each end of a sway-beam O, and running on lateral guide-rails, while the upper body A is carried upon the lower body B by means of springs S the ends of which are pivoted to longitudinal bars T fixed to the lower body.

2. In a motor-vehicle, the combination of the two separate bodies A and B, two motors L centrally in the lower body, and suspended by pivoted links L' from the top girders thereof while the casings of the motors are connected by rigid arms L² respectively to the crank-axle to which the motor is coupled, so that on the occurrence of a slight vertical motion of the axles relatively to the body B, the arms will always maintain the same distance between the motor-shaft and axle, in causing the motor to oscillate slightly upon its suspending-link.

3. In a motor-vehicle for single-rail elevated railways, the combination with a series of vertical blades or wings mounted on vertical pivots, of pockets or recesses at the back of said blades, and mechanism for causing said blades or wings to project outward beyond the sides of the carriage and uncover said pockets to present surfaces for the impinging of air with such force as to retard the forward motion of the carriage, substantially as specified.

4. In a motor-vehicle for single-rail elevated railways, the combination of a lower body B suspended from the running wheels by springs K and rods T, guide-wheels Q mounted on the ends of sway-beams O carried in a yielding manner by the said body and adapted to run on lateral guide-rails, saddle or bridge shaped connections O' connecting the opposite sway-beams with each other and an upper body A carried on the lower body B by means of springs S pivotally connected to the lower body, substantially as described.

In testimony whereof I have signed my name to this specification, in the presence of two subscribing witnesses, this 14th day of May, A. D. 1897.

FRITZ B. BEHR.

Witnesses:
  JNO. P. M. MILLARD,
  WALTER J. SKERTEN.